United States Patent [19]

Yamazaki

[11] Patent Number: 4,654,570
[45] Date of Patent: Mar. 31, 1987

[54] UPWARD TRACING SYSTEM

[75] Inventor: Etuo Yamazaki, Hachioji, Japan

[73] Assignee: Fanuc Ltd., Minamitsuru, Japan

[21] Appl. No.: 823,500

[22] PCT Filed: May 22, 1985

[86] PCT No.: PCT/JP85/00282
§ 371 Date: Jan. 21, 1986
§ 102(e) Date: Jan. 21, 1986

[87] PCT Pub. No.: WO85/05308
PCT Pub. Date: Dec. 5, 1985

[30] Foreign Application Priority Data
May 23, 1984 [JP] Japan .................. 59-104120

[51] Int. Cl.$^4$ .......................................... G05B 19/42
[52] U.S. Cl. ..................................... 318/578; 364/475
[58] Field of Search ............... 318/578, 571, 579, 567, 318/568, 569; 364/474, 475; 409/98, 99, 126, 127, 130, 184, 210, 218

[56] References Cited
U.S. PATENT DOCUMENTS
4,456,864  6/1984  Imazeki ............................ 318/578
4,599,022  7/1986  Yamazaki .......................... 318/578

Primary Examiner—William M. Shoop, Jr.
Assistant Examiner—Patrick C. Keane
Attorney, Agent, or Firm—Staas & Halsey

[57] ABSTRACT

A tracing system which ensures clamping only a downward feed of a tracer head (TR), thereby preventing a cutter (CT) from being broken.

Clamping of the feed of the tracer head (TR) in the direction of cutting is ensured, by the provision of machine position sensing circuitry (PCZ, CNTZ) for sensing the machine position in a vertical axis (the Z-axis), and initializing circuit (CPU) for setting a predetermined value α in a vertical displacement storage devict (REG) at the start of tracing. An adding circuit (CPU) reads out the results of sensing by the machine position sensing circuitry for each predetermined period and adds the difference between the current and the preceding results of sensing to the vertical displacement storage device (REG). An update circuit (CPU) sets the predetermined value α in the storage device (REG) when its contents reach a predetermined value β and circuitry (CPU, GC, CLP) for stopping the feed of the tracer head in the vertical axis and for performing a clamp feed of the tracer head when the contents of the vertical displacement storage device (REG) go down below a predetermined value γ.

6 Claims, 4 Drawing Figures

UPWARD TRACING SYSTEM

BACKGROUND OF THE INVENTION

The present invention relates to an upward tracing system for tracer control equipment which traces the surface of a model by means of a tracer head, and more particularly to an upward tracing system which clamps only a downward feed of the tracer head over a hollow in the model surface so as to prevent a cutter from going down.

In profiling through use of a face mill cutter or the like, the cutter will be broken when it descends. To avoid this, it is customary in this kind of profiling to employ an upward tracing system which executes a clamp feed when the cutter is about to go down during tracing, thereby inhibiting the cutter from descending.

Conventionally, the upward tracing system initiates the clamp feed upon detecting that the velocity component in the vertical axis (usually the Z-axis) of the tracking direction, which is obtained by calculation from signals available from the tracer head tracing the model surface, has come to assume a negative value indicating descent of the cutter. However, this system possesses such defects as follows:

(1) In general, a stylus of the tracer head performs a transient, up-and-down pulsating movement at the start of tracing. As a result, even if the model surface is horizontal or flat, the velocity component in the vertical axis may sometimes go negative at the start of tracing, in which case the clamp feed takes place, inducing a tracing error.

(2) In the case where the model surface gently slopes down, the distances of the downward movement of the tracer head is appreciable, but the negative value of the velocity component in the vertical axis is so small that it is difficult to detect with a high degree of accuracy. Especially, in the case of effecting the clamp feed when the velocity component in the vertical axis goes down below a certain negative value so as to avoid the disadvantage mentioned above in (1), it is difficult to inhibit the cutter from descending when the model surface gently slopes down.

(3) The tracing velocity obtained by calculation is applied via an amplifier circuit or the like to a servo motor. In this case, even if the velocity component in the vertical axis is zero due to aging of the amplifier circuit or the like, the cutter may sometimes go down. Therefore, the detection of a descent of the cutter according to the value of the velocity component in the vertical axis is inevitably affected by the aging of the amplifier circuit or the like, making reliable upward tracing difficult.

SUMMARY OF THE INVENTION

The present invention offers a solution to such problems as mentioned above, and has for its object to ensure clamping only a downward feed of the tracer head.

The gist of the present invention resides in an upward tracing system which clamps only a downward feed of the tracer head over a depression in the model surface so as to prevent the cutter from descending, for use in tracer control equipment which performs tracer control according to the direction and speed of tracing calculated from signals obtainable from the tracer head tracing the model surface. The upward tracing system of the present invention is provided with a storage means for storing the amount of machine movement in the vertical axis, a sensing means for sensing the machine position in the vertical axis, an initializing means for setting a predetermined value $\alpha$ in the storage means at the start of tracing, an adding means for reading out the contents of the machine position sensing means for each predetermined period and for adding the difference between the current and the preceding contents to the storage means, an update means for setting the predetermined value $\alpha$ in the storage means when its contents reach a predetermined value $\beta$, and a means for stopping the feed in the vertical axis and performing a clamp feed when the contents of the storage means go down below a predetermined value $\gamma$. The values $\alpha$, $\beta$ and $\gamma$ bear such relationships that $\gamma < \alpha < \beta$. With such an upward tracing system, even if the stylus transiently pulsates at the start of tracing, the possibility of triggering the clamp feed will be eliminated by setting $\alpha - \gamma$ to a value somewhat greater than the maximum amount of descent of the stylus. Furthermore, also in the case where the model surface gently slopes down, the clamp feed will take place when the stylus goes down by up to $\beta - \gamma$. By selecting the value $\beta - \gamma$ to be equal to the permissible maximum amount of descent of the stylus which is defined according to the characteristics of the cutter used, it will be possible to ensure the clamp feed even when the stylus gradually descends. Moreover, since the determination as to whether the clamp feed should be effected or not is made based on the actual amount of descent of the stylus, not on the feed rate component, it will be almost free from the influence of aging of each part of equipment.

DETAILED DESCRIPTION OF THE PREFERRED EMBODIMENT

Figure 1:
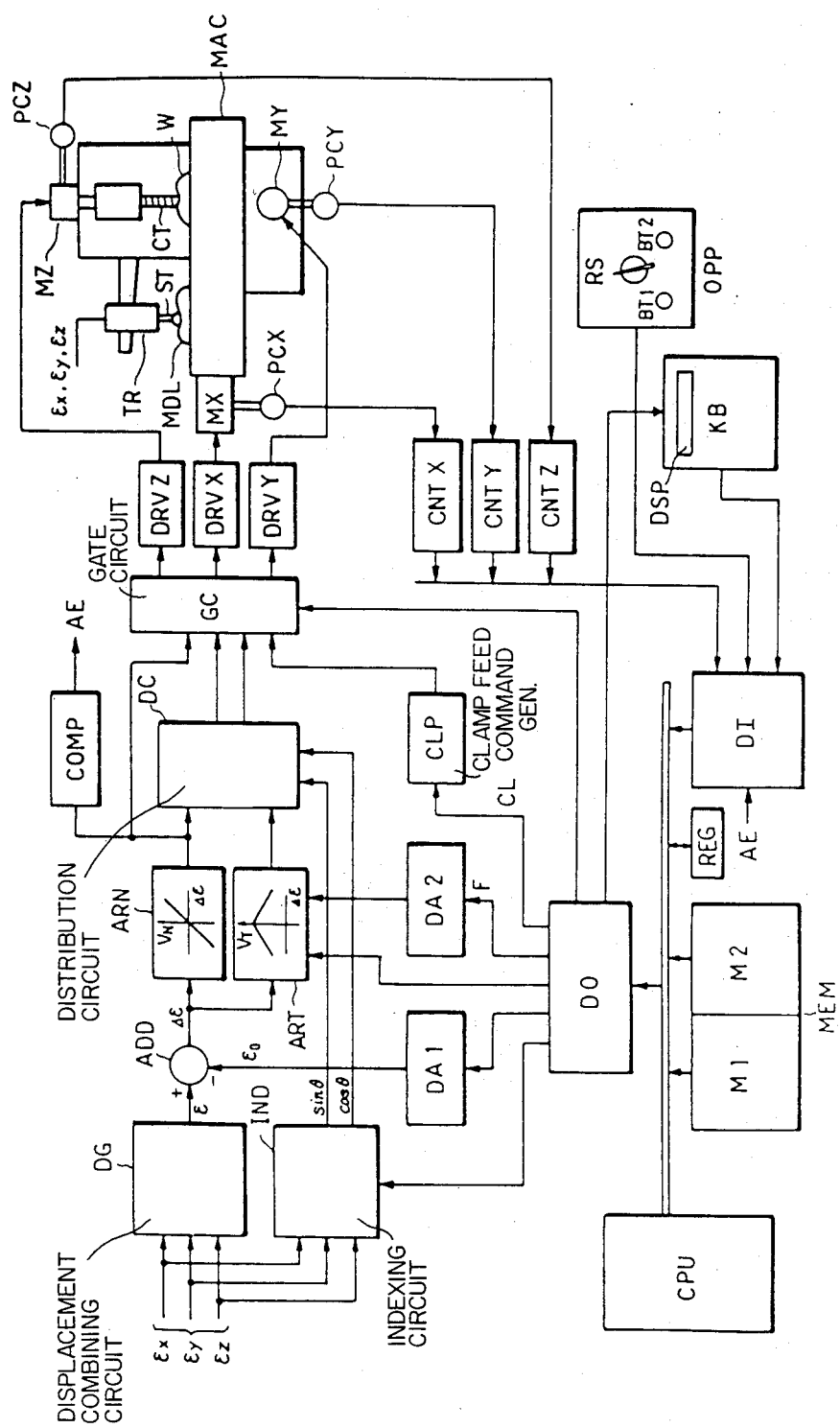
FIG. 1 is a block diagram of an embodiment of the present invention.

FIG. 1 illustrates in block form an embodiment of the present invention. Reference characters DG and IND indicate a displacement combining circuit and an indexing circuit which are supplied with displacement signals $\epsilon_x$, $\epsilon_y$ and $\epsilon_z$ from a tracer head TR; ARN and ART velocity calculation circuits; ADD an adder; DC a distribution circuit; COMP a comparator; GC a gate circuit; DRVX, DRVY and DRVZ amplifying output circuits; MX, MY and MZ servo motors; PCX, PCY and PCZ position sensors; MDL a model; ST a stylus; CT a cutter; W a workpiece; MAC a tracing machine; CNTX, CNTY and CNTZ reversible counters which count pulses from the position sensors to indicate the current position; CLP a clamp feed command generator; OPP an operator panel; RS a feed rate or like setting dial; BT1 and BT2 push buttons; KB a keyboard; DSP a display part; DI a data input device; MEM a memory composed of a data memory part M1 and a control program part M2; DO a data output device, CPU a processor; DA1 and DA2 D/A converters; and REG a register.

The stylus ST is brought into contact with the model MDL and is then fed by the servo motors. Based on the displacement signals $\epsilon_x$, $\epsilon_y$ and $\epsilon_z$ corresponding to the displacement of the stylus ST, the displacement combining circuit DG yields a composite displacement signal $\epsilon = \sqrt{\epsilon_x^2 + \epsilon_y^2 + \epsilon_z^2}$ and the indexing circuit IND yields displacement direction signals $\sin\theta$ and $\cos\theta$. The composite displacement signal $\epsilon$ is applied to the adder ADD, wherein a difference $\Delta\epsilon$ between it and a reference displacement signal $\epsilon_0$ is obtained. The velocity calculation circuits ARN and ART yield normal and tangential velocity signals $V_N$ and $V_T$. The distribution circuit DC produces a command velocity signal on the basis of the displacement direction signals $\sin\theta$ and $\cos\theta$. The command velocity signal is provided to one of the amplifying output circuits selected by the gate circuit GC. By the amplified output the corresponding servo motor is driven, feeding the cutter CT and the tracer head TR as one body.

In an approach operation, until the stylus ST is moved into contact with the model MDL, the processor CPU reads out of the memory MEM data such as the approach axis, the approach direction and the approach speed and activates, for example, the amplifying output circuit DRVZ via the data output device DO to drive the servo motor MZ, bringing down the tracer head TR and the cutter CT. Since the displacement signals $\epsilon_x$, $\epsilon_y$ and $\epsilon_z$ are zero before the stylus ST is brought down into contact with the model MDL, the difference signal $\Delta\epsilon$ is equal in absolute value to the reference displacement signal $\epsilon_0$. When the composite displacement signal $\epsilon$ becomes equal to the reference displacement signal $\epsilon_0$ upon contact of the stylus ST with the model MDL, the comparator COMP detects that $\Delta\epsilon = \epsilon - \epsilon_0 = 0$ and applies an approach end signal AE to the data input device DI. When the processor CPU reads out the approach end signal AE and detects the completion of approach, tracing is started.

The memory MEM has stored therein tracing modes (such as both ways scan tracing, one way scan tracing, contour tracing and so forth) a tracing direction, a tracing speed, a pick feed direction, a pick feed speed, a pick feed value, a tracing return position, etc. Upon the start of tracing, the processor CPU reads out the stored contents of the memory MEM and performs tracer control.

Further, parameters $\alpha$, $\beta$ and $\gamma$ (where $\gamma < \alpha < \beta$) related to the upward tracing function, are entered and stored in the data memory part M1 of the memory MEM from the keyboard KB.

The register REG constitutes a means for storing the amount of movement in the vertical axis, and it is accessible from the processor CPU. An area of the memory MEM can also be used in place of the register REG.

Figure 2:
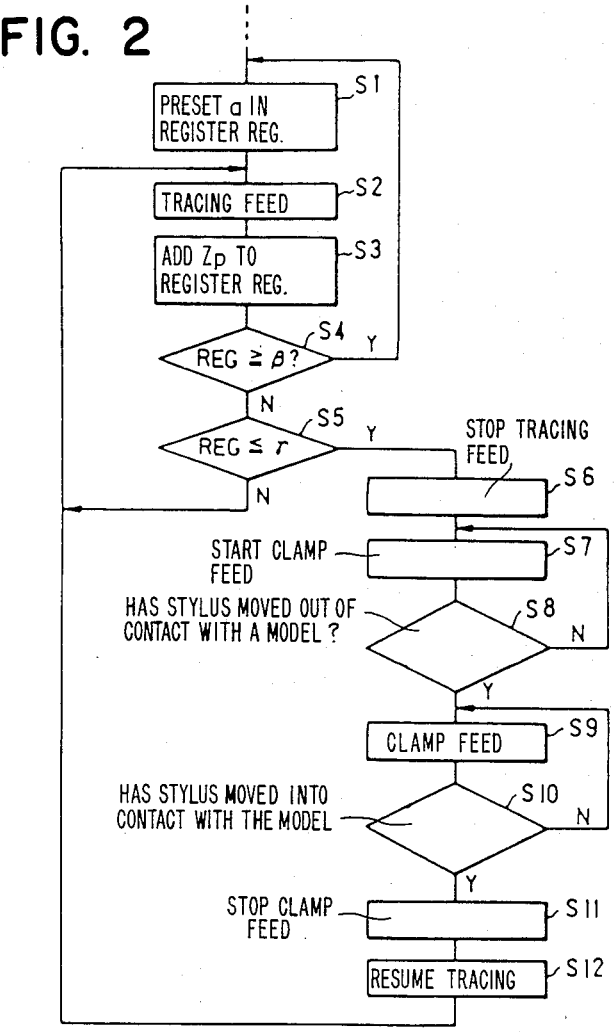
FIG. 2 is a flowchart for explaining the operation of the embodiment of the present invention.

In the execution of the upward tracing function the processor CPU performs, for instance, such processing as shown in the flowchart of FIG. 2. Upon completion of the approach, the processor first presets the value $\alpha$ in the register REG (S1) and when switches the gate circuit GC, starting a tracing feed (S2). Upon starting the tracing feed, the processor CPU reads out the contents of the counter CNTZ, computes the difference between its current and previous contents to obtain the amount of movement Zp in the vertical axis and enters it into the register REG (S3). Next, the processor compares the contents of the register REG and the value $\beta$ (S4) and when the former exceeds the latter, the processor returns to the step S1, resetting the value $\alpha$ in the register REG again. When the contents of the register REG are smaller than the value $\beta$, the processor compares the contents of the register REG with the value $\gamma$ (S5) and when the former is greater than the latter, the processor returns to the step S2 and continues the tracing feed (and accordingly the updating of the contents of the register REG is also effected at a predetermined period). When the contents of the register REG become smaller than the value $\gamma$, the processor switches the gate GC to stop the tracing feed (S6) and at the same time supplies a predetermined one of the servo motors with a clamp feed command signal which is created by the clamp feed command generator CLP (S7). Upon starting the clamp feed, the stylus ST moves out of contact with the model MDL and the difference signal $\Delta\epsilon$ becomes nearly equal in absolute value to the reference displacement signal $\epsilon_0$. The processor detects this (S8) and performs the clamp feed (S9). By this operation the stylus ST is fed in the horizontal direction without tracing, that is, the clamp feed takes place.

When the stylus ST again moves into contact with the model MDL as a result of the clamp feed, the composite displacement signal $\epsilon$ becomes equal to the reference displacement signal $\epsilon_0$ and the difference signal $\Delta\epsilon$ becomes zero. Having detected this (S10), the processor switches the gate GC, discontinuing the clamp feed and resuming the tracing feed (S11, S12).

Figure 3:
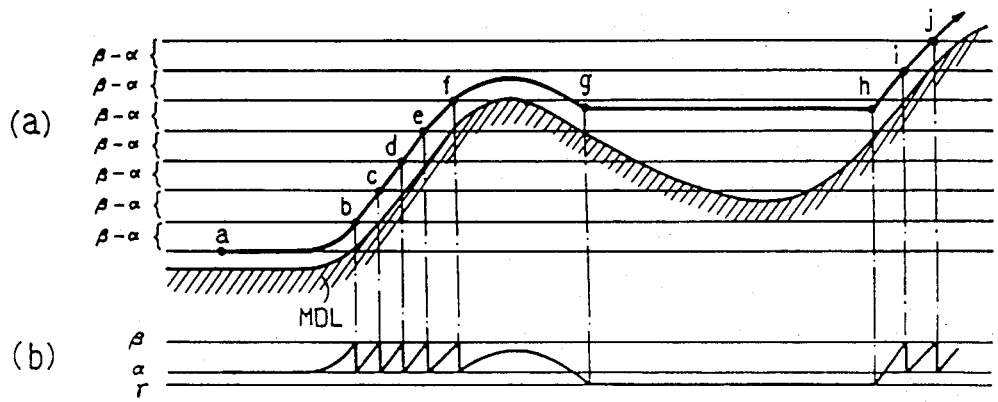
FIGS. 3a and b are diagrams showing the movement of the tracer head and variations in the contents of a register REG when a model having a hollow is traced.

FIG. 3(a) shows, by a thick solid line, the path of movement of the stylus ST in the case of tracing the model MDL having a depression (which path is equivalent to the path of movement of the cutter), together with thin lines drawn in the lateral direction at intervals of $\beta - \alpha$ to indicate a standard of the amount of movement of the stylus in the vertical axis. FIG. 3(b) shows variations in the contents of the register REG in this instance. Assuming that tracing starts at a point a, the contents of the register REG are preset to the value $\alpha$ at the point and are updated as the cutter is driven along with the stylus. When the stylus ascends by the value $\beta - \alpha$ from the point a, the contents of the register REG become $\beta$, and hence is preset to the value $\alpha$ (steps S4 and S1). Similarly, at points c to f the contents of the register REG are preset to the value $\alpha$. As the stylus approaches the depression of the model, the stylus and the cutter begin to descend and the contents of the register REG also decrements correspondingly. Then the clamp feed is initiated at a point g where the contents of the register REG assumes a value $\gamma$. When the stylus makes contact with the model again at a point h, the tracing feed takes place again and the contents of the register REG are updated in the same manner as mentioned above. Incidentally, when the stylus gets into touch with the model again, it is somewhat raised by the clamp feed and the contents of the register REG exceed the value $\gamma$, so the clamp feed will not be resumed. Of course, provision can also be made for presetting the contents of the register REG to the value $\alpha$ when the clamp feed is effected.

By setting the value $\alpha - \gamma$ somewhat greater than the maximum amount of descent of the stylus during its pulsating movement at the start of tracing and by selecting the value $\beta - \gamma$ equal to the maximum permissible amount of descent of the stylus which is defined by the characteristics of the cutter or the like used, it will be possible to ensure the execution of the clamp feed even if the model surface gently slopes down. Furthermore, since the determination as to whether to execute the clamp feed is made based on the actual amount of descent of the stylus, not on the feed rate component, it will not substantially be affected by aging of each part of equipment. By using zero as the parameter $\beta$, its setting can be omitted. In this instance, the parameter $\alpha$ is set to a value a little greater than the maximum amount of descent of the stylus during its pulsating movement at the start of tracing.

As described above, according to the present invention, even if the stylus transiently moves up and down at the start of tracing, there is no possibility of the clamp feed being triggered. Moreover, even if the model surface gently slopes down, the clamp feed will take place when the stylus descends by up to $\beta-\gamma$. By selecting the value $\beta-\gamma$ to be in agreement with the maximum permissible amount of descent which is determined by the characteristics of the cutter or the like used, the clamp feed can be achieved with certainty even when the model surface gently slopes down. Besides, since the actual amount of descent of the stylus (not the tracing feed rate) is utilized for deciding whether the clamp feed is to be effected or not, there will be produced the effect that the decision is almost free from the influence of aging of each part of equipment.

What is claimed is:

1. An upward tracing system for tracer control equipment which performs tracer control in accordance with the direction and speed of tracing calculated from signals obtainable from the position of the tracer head tracing a surface of a model, comprising:
    first means for sensing the position of the tracer head along a vertical axis;
    second means for storing an amount of tracer head movement along the vertical axis;
    processing means for setting a first predetermined value in said second means at the start of tracing, for reading out the contents of said first means for each of a plurality of periods, for adding the difference between the current and the preceding contents of said second means to said second means, for setting the first predetermined value in said second means when its contents reaches a second predetermined value, and for generating a clamp feed signal when the contents of said second means goes below a third predetermined value, wherein the third predetermined value is less than the first predetermined value which is less than the second predetermined value; and
    third means for stopping the feed of the tracer head along the vertical axis and for performing a clamp feed of the tracer head in accordance with the clamp feed signal generated by said processing means, so that only a downward feed of the tracer head over a hollow in the surface of the model is subjected to clamp feed.

2. An upward tracing system for clamping only a downward feed of a tracer head over a hollow in the surface of a model so as to prevent a downward movement of a cutter, said upward tracing system for use in tracer control equipment which performs tracer control in accordance with the direction and speed of tracing calculated from signals obtainable from the tracer head tracing the model surface, comprising:
    storage means for storing the amount of tracer head movement in a vertical axis;
    machine position sensing means for sensing the tracer head position in the vertical axis;
    initializing means for setting a predetermined value $\alpha$ in said storage means at the start of tracing;
    adding means for reading out the contents of said machine position sensing means for each period and for adding the difference between the current and the preceding contents thereof to said storage means;
    update means for setting the value $\alpha$ in the storage means when its contents reaches a predetermined value $\beta$; and
    means for stopping the feed of the tracer head in the vertical axis and for performing a clamp feed of the tracer head when the contents of said storage means goes below a predetermined value $\gamma$, wherein the predetermined values $\alpha$, $\beta$ and $\gamma$ are selected so that $\gamma<\alpha<\beta$.

3. An upward tracing system according to claim 1, wherein:
    said storage means comprises a register; and
    said machine position sensing means comprises:
        a position sensor, coupled to the tracer head, for providing position pulses corresponding to the position of the tracer head; and
        a counter coupled to said position sensor.

4. An upward tracing system according to claim 2, further comprising means for driving the tracer head in the vertical direction, wherein:
    said adding means and said update means are formed by a processor which is coupled to said register and said counter; and
    said means for stopping the feed of the tracer head and for performing a clamp feed of the tracer head comprises:
        said processor which generates a clamp feed signal when the contents of the storage means goes below the predetermined value $\gamma$;
        a clamp feed command generator, coupled to said processor, for receiving the clamp feed signal and for generating a clamp feed command signal; and
        a gate circuit, coupled to said clamp feed command generator and said means for driving the tracer head in the vertical direction, for controlling the clamp feed of the tracer head in accordance with the clamp feed command signal.

5. A method of performing a clamp feed of a tracer head in tracer control equipment which performs tracer control in accordance with the direction and speed of tracing calculated from signals obtainable from the tracer head which traces a model surface, comprising the steps of:
    (a) setting a first predetermined value in a register for storing an amount of tracer head movement along a vertical axis;
    (b) sensing the position of the tracer head along the vertical axis at predetermined intervals;
    (c) adding the difference between current and preceding position values sensed in said sensing step (b) to the contents of the register;
    (d) setting the first predetermined value in the register when the added value produced by said step (c) reaches a second predetermined value; and
    (e) stopping the feed of the tracer head along the vertical axis and performing a clamp feed of the tracer head when the added value produced by said step (c) is below a third predetermined value, wherein the third predetermined value is less than the first predetermined value which is less than the second predetermined value.

6. A method according to claim 5, further comprising the steps of:
    determining whether the tracer head has moved into contact with the model after the clamp feed of step (e) has begun; and
    stopping the clamp feed when it is detected that the tracer head has moved into contact with the model.

* * * * *

UNITED STATES PATENT AND TRADEMARK OFFICE
CERTIFICATE OF CORRECTION

PATENT NO. :   4,654,570
DATED      :   MARCH 31, 1987
INVENTOR(S):   ETUO YAMAZAKI

It is certified that error appears in the above-identified patent and that said Letters Patent is hereby corrected as shown below:

```
FRONT PAGE [73] "Ltd." should be --Ltd--;

[57] ABSTRACT
                line 3, after "broken.", continue with
                line 4, with no paragraph indentation;

line 9, "devict" should be --device--.

Col. 6, line 10, "1," should be --2,--;
        line 18, "2," should be --3,--.
```

Signed and Sealed this

Eleventh Day of August, 1987

Attest:

DONALD J. QUIGG

*Attesting Officer*   *Commissioner of Patents and Trademarks*